(12) United States Patent
Chapuis

(10) Patent No.: US 8,179,705 B2
(45) Date of Patent: May 15, 2012

(54) APPARATUS AND METHOD OF OPTIMIZING POWER SYSTEM EFFICIENCY USING A POWER LOSS MODEL

(75) Inventor: Alain Chapuis, Riedikon (CH)

(73) Assignee: Power-One, Inc., Camarillo, CA (US)

( * ) Notice: Subject to any disclaimer, the term of this patent is extended or adjusted under 35 U.S.C. 154(b) by 867 days.

(21) Appl. No.: 12/127,726

(22) Filed: May 27, 2008

(65) Prior Publication Data

US 2009/0296432 A1  Dec. 3, 2009

(51) Int. Cl.
*H02M 7/797* (2006.01)

(52) U.S. Cl. .................... 363/141; 323/266; 700/298

(58) Field of Classification Search .............. 323/266, 323/283; 700/298; 363/65, 141
See application file for complete search history.

(56) References Cited

U.S. PATENT DOCUMENTS

| | | | |
|---|---|---|---|
| 4,021,729 A | 5/1977 | Hudson | |
| 4,147,171 A | 4/1979 | Greene et al. | |
| 5,325,062 A | 6/1994 | Bachand et al. | |
| 5,508,606 A | 4/1996 | Ryczek | |
| 5,610,826 A | 3/1997 | Whetsel | |
| 5,684,686 A | 11/1997 | Reddy | |
| 6,160,697 A | 12/2000 | Edel | |
| 6,194,856 B1 | 2/2001 | Kobayashi et al. | |
| 6,614,612 B1 | 9/2003 | Menegoli et al. | |
| 6,651,178 B1 * | 11/2003 | Voegeli et al. | 713/300 |
| 6,665,525 B2 | 12/2003 | Dent et al. | |
| 6,972,972 B2 * | 12/2005 | Duncan et al. | 363/56.01 |
| 7,000,315 B2 | 2/2006 | Chua et al. | |
| 7,035,064 B2 * | 4/2006 | Schimanek et al. | 361/23 |
| 7,071,660 B2 * | 7/2006 | Xu et al. | 323/266 |
| 7,301,313 B1 | 11/2007 | Hart et al. | |
| 7,315,157 B2 | 1/2008 | Chapuis | |
| 7,315,160 B2 | 1/2008 | Fosler | |
| 7,584,371 B2 | 9/2009 | Zhang | |
| 7,701,156 B2 * | 4/2010 | Okamura | 318/255 |
| 2005/0289373 A1 * | 12/2005 | Chapuis et al. | 713/300 |
| 2007/0114985 A1 | 5/2007 | Latham et al. | |

FOREIGN PATENT DOCUMENTS

EP  0877468  11/1998

* cited by examiner

*Primary Examiner* — Harry Behm
(74) *Attorney, Agent, or Firm* — O'Melveny & Myers LLP

(57) ABSTRACT

A power subsystem is actively optimized to improve total subsystem efficiency in a way that is responsive to changes in load requirements, power supply variations, and subsystem temperature variations. Detailed, multidimensional power loss models are developed for constituent devices which are then combined into a power subsystem containing a controller and circuity for measuring device operating parameters such as input and output voltage, output current, and temperature. Operating parameters are continually monitored, and set points are correspondingly changed based on the detailed power loss models to achieve maximum overall efficiency for the instantaneous operating state of the system.

28 Claims, 6 Drawing Sheets

APPARATUS AND METHOD OF OPTIMIZING POWER SYSTEM EFFICIENCY USING A POWER LOSS MODEL

BACKGROUND OF THE INVENTION

1. Field of the Invention

The present invention relates to power subsystem architectures, and more particularly, to a power subsystem that actively provides energy management and control of subsystem efficiency by using power-loss models of power devices.

2. Description of Related Art

It is well known in the art to use a distributed power subsystem architecture comprising multiple power conversion stages to provide necessary bus voltages for microprocessors, memories, and other electronic devices. A conventional system might operate from an alternating current (AC) primary voltage source that is converted to an intermediate direct current (DC) bus voltage using an isolated AC/DC converter. This intermediate DC bus voltage is then typically distributed throughout the system and converted locally by secondary DC/DC converters to lower voltages matched to the input voltage requirements of system loads. Alternatively, a system might operate from a primary DC bus voltage that is first converted to an intermediate bus voltage by an isolated DC/DC converter. The intermediate voltage is again distributed to secondary regulators or converters to provide the required supply voltages. Examples of conventional systems are depicted in FIGS. 1 and 2 which illustrate, respectively, an AC system operating at 230 VAC with an intermediate bus at 12 VDC, and a DC system operating at 48 VDC with an intermediate bus at 12 VDC.

The efficiency of any power converter or regulator is typically a complex function of its operating point, depending on the input voltage, the output voltage, the load current, and the temperature of the device, among other parameters. Thus, the efficiency will typically vary with system activity as loads are switched on or off or run at high or low clock rates and as the system heats up or cools down. Nevertheless, once designed and optimized for a particular operating point, conventional power subsystems are operated statically, regardless of system activity.

In the system depicted in FIG. 1, the efficiency of the primary power converter will tend to increase as the input voltage increases, and the efficiency will decrease as the output voltage decreases and as the temperature rises. Similarly, the efficiency of the regulators will tend to increase as the input voltage decreases and as the output voltage rises, and the efficiency will decrease as the temperature rises. The behavior of the system in FIG. 2 is similar. Thus, it is clear that the selection of the intermediate voltage will affect the efficiency of the overall system. Lowering the intermediate voltage will reduce the efficiency of the primary converter but raise the efficiency of the secondary regulators. Thus for a given operating state of the system, there is an optimal intermediate voltage that will maximize the overall efficiency of the system. Similarly, although the efficiency of both the primary converter and the secondary regulators decrease as the temperature increases, operating a fan or other active cooling system consumes power and thus reduces system efficiency. Thus, there is also an optimal temperature set point for a given operating state of the system that will maximize power efficiency.

In a typical system, the power subsystem is optimized for a single operating point that would preferably be the operating point at which the system would be found most often. The intermediate voltage and temperature control point are set to this operating point and generally remain fixed, regardless of the actual operating state of the system. However, to reduce total energy consumption, it would be better to dynamically optimize the set points of the power subsystem based on actual system activity. However, in many cases, it is impractical to measure the power loss of a power conversion device directly with enough accuracy to enable effective control. For the most part, this is because measuring the power loss involves taking the difference of two large quantities, the input power and the output power, to arrive at a small power loss measurement. For example, a typical converter might run at an input power of 100 W and an output power of 92 W, resulting in a power loss of 8 W. If the input and output power losses can each be measured with a precision of ±2%, which is a challenge in itself, the calculation of the power loss will exhibit a large combined error as illustrated below:

$$(100\ W \pm 2\ W) - (92\ W \pm 1.8\ W) = 8\ W \pm 2.7\ W,$$

assuming that the input and output power measurement errors are uncorrelated. In other words, the error of the power loss measurement is +/−34%, which is clearly far too imprecise to use for effective control of system efficiency. As the efficiency of power converters improves as the technology advances, this problem only gets worse as the power losses become increasingly smaller compared to the input and output powers.

Thus, it would be useful to provide a power subsystem that utilizes active control to dynamically optimize design set points in order to maximize subsystem efficiency as system activity changes. And it would be useful to provide a method of characterizing and monitoring the power loss of the power subsystem components in a manner that provides sufficient precision to enable the dynamic optimization of design set points.

SUMMARY OF THE INVENTION

The invention provides a power subsystem architecture and a method of characterizing power subsystem components to enable dynamic optimization of design set points to achieve maximum power efficiency across all operating states of a system.

An embodiment of a power subsystem in accordance with the present invention includes a power bus that may be alternating current (AC) or direct current (DC). A primary power converter converts the primary bus voltage to an intermediate voltage that is distributed to one or more secondary power converters. The secondary power converters may be linear regulators, switching converters, boost converters, buck converters, or any other type of voltage-regulating device known in the art. The one or more secondary converters condition the power that is provided to the system loads.

In one embodiment of a power subsystem in accordance with the present invention, the individual power devices are adapted to measure temperature, current, voltage, and other operating parameters at the device level and to make the measurement data available over a communications bus such as I²C, RS-485, or any other communication bus known to those skilled in the art. In an alternative embodiment, an external measurement unit is adapted to measure operating parameters of the individual devices. The external measurement unit may comprise a centrally located device or may comprise a collection of individual measurement devices distributed throughout the system. The measured operating parameters may include input and output voltages, input and output currents, and device temperature, among others. The specific transducers and detectors used to make such measurements are well known in the art.

The power subsystem also includes a controller unit that may include an application-specific integrated circuit (ASIC), a field-programmable gate array (FPGA), a digital signal processing (DSP) device, a microcontroller, a general-purpose processing device, or any other type of processing device. The controller unit includes a communications unit that communicates with the power devices in the system. In an alternative embodiment including an external measurement unit, the communications unit may also communicate with the external measurement unit. The controller unit also includes a memory unit that contains detailed power-loss model data for each of the power components of the system.

In one embodiment of a power system in accordance with the present invention, the controller unit is a module within the power subsystem, interfaced to the other devices and adapted to collect telemetry from and send commands to the other system devices. In another embodiment, the controller is external to the power subsystem and could comprise, for example, a computer or microprocessor adapted to control the power subsystem. In still another embodiment, the controller could be implemented within one of the power devices itself. For example, the logic circuitry used to operate the primary power converter could also operate as the controller unit.

In general, the efficiency of a power device is a complex function of a number of operating parameters, such as input and output voltage, current, and temperature, among others. Before the power subsystem is assembled, each of the power devices is independently characterized to measure its power loss, or efficiency, for a large number of different operating conditions. As each operating parameter is varied, the power loss of the device under characterization is measured, and a data point is saved and later written to the memory unit of the power subsystem. The desired level of precision of the power-loss model will dictate how many data points are to be measured and how close their spacing should be. The application for which the power subsystem is to be used will set the required level of precision. Using the measured data points, a function is created that predicts the power loss of the characterized device for an arbitrary combination of operating parameters. Because the measured data consists of a set of discrete data points, it is necessary to interpolate between data points using a linear interpolation model, a cubic spline model, or any other interpolation model known in the art. Similarly, to address operating modes that lie outside of the measured data set, extrapolation methods known in the art may be used.

The controller unit also contains a processor unit that is adapted to collect data on the operating parameters of the power devices. The processor unit then uses the power-loss models stored in the memory unit along with the operational data to create an estimate of the instantaneous power loss of each of the power components. The processor unit then performs a weighted sum of the power losses of each of the power components to arrive at a goal function. The goal function has a relationship with the total power loss of the system. Indeed, if the weighting factors used in forming the sum of the component power losses are all set to unity, the goal function will be identical to the total system power loss. However, the freedom to set weighting factors provides the system with additional capability to allocate costs to the various components. For example, if it is much harder to cool the primary converter than other components of the system, weighting factors may be selected to reflect this.

The processor then proceeds to evaluate the effect on the goal function of small changes to the operating parameters of each of the components with the objective of minimizing the goal function and thereby maximizing the efficiency of the subsystem. If the processor determines, for example, that lowering the intermediate bus voltage will result in an improvement of overall subsystem efficiency, it will then command that change to the primary power converter to cause its output voltage to change to the optimal value calculated by the processor. The measurement, calculation, and command cycle will be repeated at a rate set by the demands of the application for which the power subsystem is used. This process results in the dynamic optimization of the efficiency of the subsystem, taking into account changes in loads or operating modes.

Sometimes, commanding the system to change an intermediate voltage or other parameter might have negative consequences, such as reducing the input voltage to the secondary converters below their recommended levels. To address this, an alternative embodiment of a power subsystem in accordance with the invention also includes a set of subsystem constraint data that is stored in the memory unit. This data may include limits on such parameters as the input voltage, output voltage, temperature, and current, among others, that should not be exceeded in applying a change of state to the system. The constraint data may also change over time. The processor will minimize the goal function subject to the power component constraints such that a commanded change of state will not violate any of the constraints.

Similarly, some loads that the power subsystem is designed to supply may have limits on current, voltage, temperature, or other parameters that must be kept within an acceptable range. Thus, another embodiment of a power subsystem in accordance with the invention includes a load constraints database that is stored in the memory unit. The minimization of the goal function by the processor will be performed subject to the load constraints such that none of them is violated.

Another embodiment of a power subsystem in accordance with the present invention includes an active cooling system such as a fan, a heat pump, or other active temperature-control device. Power loss models for the cooling system are developed in the same manner as discussed above and are stored in the memory unit. The processor unit is further adapted to include the cooling system in the evaluation of the goal function in order to maximize subsystem efficiency. For example, many power devices may operate more efficiently at lower temperatures. However, it also takes energy to run the active cooling system. The goal function is used to balance these trades and arrive at the optimal amount of cooling that minimizes the overall subsystem power loss.

From the foregoing discussion, it should be clear to those skilled in the art that certain advantages of a dynamically optimized power conversion system have been achieved. Further advantages and applications of the invention will become clear to those skilled in the art by examination of the following detailed description of the preferred embodiment. Reference will be made to the attached sheets of drawing that will first be described briefly.

DETAILED DESCRIPTION OF THE PREFERRED EMBODIMENT

The invention provides a power subsystem architecture and method of device power-loss characterization and monitoring that enables the dynamic control of operating set points to achieve high efficiency over a wide range of system operating conditions. In the detailed description that follows, like element numerals are used to indicate like elements appearing in one or more of the figures.

Figure 1:
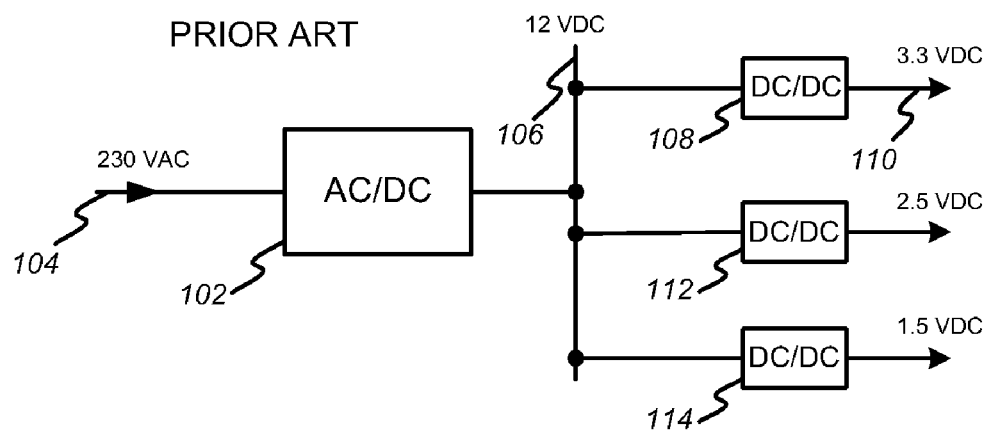
FIGS. 1 and 2 depict typical distributed power subsystem architectures for an AC and a DC primary bus, respectively.
Figure 2:
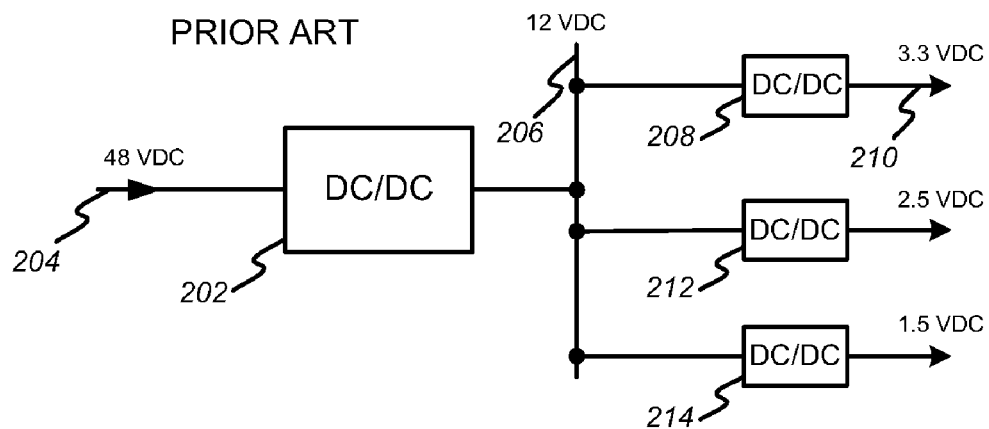

Conventional distributed power subsystem architectures are depicted in the block diagrams of FIGS. 1 and 2. In FIG. 1, an AC/DC converter 102 is used to convert a 230-volt primary AC bus 104 to a 12-volt intermediate DC bus 106. The intermediate bus 106 is distributed to secondary converters or regulators 108, 112, and 114 in order to generate the specific voltages, e.g. 110, required by the system components. FIG. 2 depicts a similar system that uses a primary DC/DC converter 202 to convert a 48-volt primary DC bus 204 to a 12-volt intermediate bus 202. In both FIG. 1 and FIG. 2, the voltage of the intermediate bus 106 or 206 is chosen based on the average loads expected at the secondary converters 108, 112, 114, 208, 212, and 214. Once set by design, the intermediate bus voltage does not vary.

Figure 3:
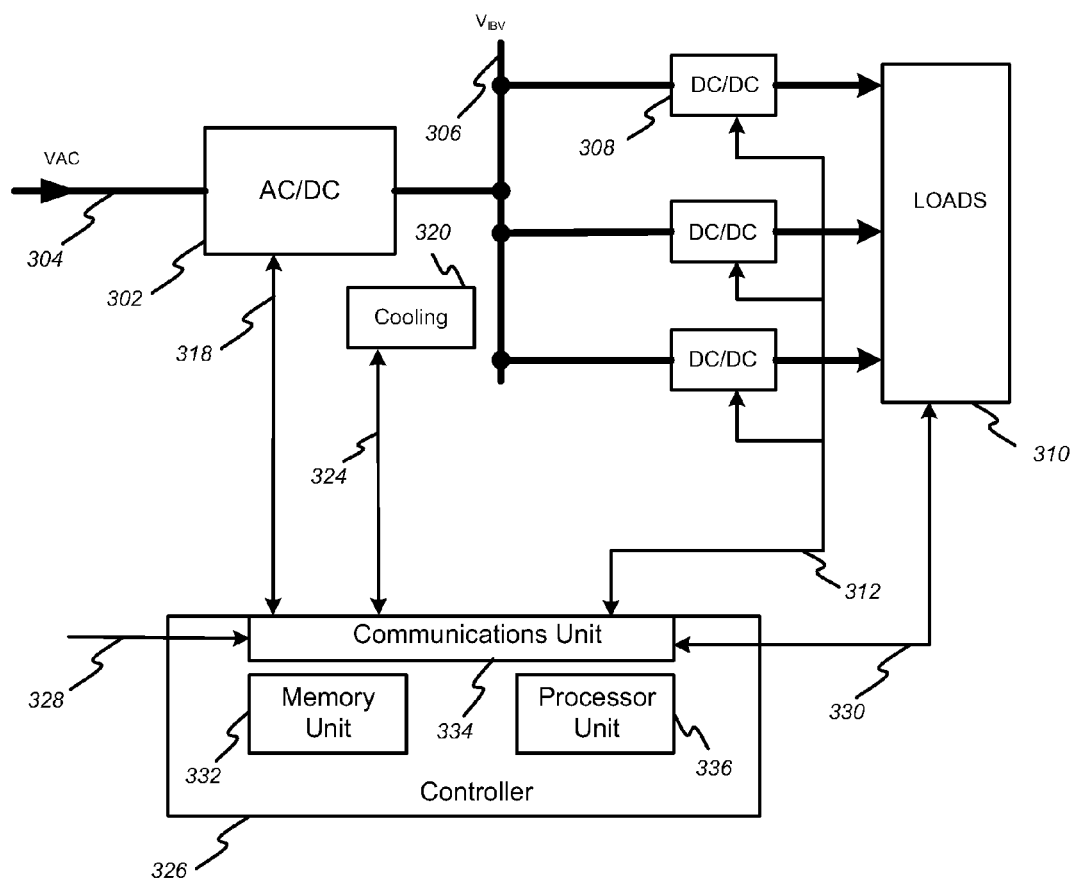
FIG. 3 depicts a block diagram of a dynamically optimized power subsystem architecture in accordance with the present invention.

FIG. 3 depicts a block diagram of an embodiment of a power subsystem in accordance with the present invention. A primary power converter 302 converts the primary AC bus 304 to an intermediate DC bus 306. It should be appreciated that a primary DC bus and a primary DC/DC converter could be used as well and still fall within the scope and spirit of the invention. The intermediate bus 306 is distributed to secondary isolated or non-isolated power converters, e.g., 308, or regulators, which may be linear regulators, switching converters, boost converters, buck converters, or any other type of voltage converter or regulator known in the art. The secondary power converters 308 condition the voltages used to drive the system loads 310.

A controller unit 326 comprises a communications unit 334 for communicating with the power subsystem components, a memory unit 332 for storing power-loss model data, and a processor unit 336 for calculating subsystem operating power losses. The controller may comprise an application-specific integrated circuit (ASIC), a field-programmable gate array (FPGA), a digital signal processing (DSP) device, a microcontroller, a general-purpose processing device, or any other processing device known in the art. The embodiment shown in FIG. 3 depicts the controller 326 as a separate module within the power subsystem with interfaces to the other power subsystem components. For example, the controller 326 might be implemented in a microcontroller having internal or external memory and interfaced to the other power subsystem components via an I$^2$C bus.

In an alternative embodiment, the controller may comprise an external device connected to the power subsystem. For example, the controller could be a computer system with its own microprocessor and memory devices that is interfaced to the power subsystem over a communications cable.

In still another embodiment, the controller may reside within one of the power devices itself. For example, the controller could be implemented within the logic circuitry of the primary power converter 302 or within one or more of the secondary converters, e.g., 308. Other physical locations of the controller are possible and would also fall within the scope and spirit of the present invention.

The communications unit 334 communicates with the power devices and other circuit elements via a communications bus such as I$^2$C, RS-485, or any other communications bus known in the art. The communications bus may be point-to-point (e.g., USB) or bussed (e.g, I$^2$C). In the embodiment illustrated in FIG. 3, the components such as the primary converter 302 and the secondary converter 308 are assumed to include sensing circuits capable of measuring at least one of temperatures, voltages, and currents and generating digital telemetry including these measurements that is sent back to the communications unit 334 over the communications bus, e.g., 318, 324, and 312. For a system using components that do not have such capability, an external measurement device may be used, as discussed below with reference to FIG. 4.

The communications unit 334 collects measurement data from the primary converter 302, the secondary converters, e.g., 308 and other system devices, e.g., 320. This measurement data may comprise, among other items, input voltage, output voltage, current, and temperature data for each of the respective power subsystem components. An optional cooling circuit 320 provides active cooling of the power system components and may comprise a fan, an active heat pump, or any other active cooling device known in the art. Operational parameters, including temperature and current consumed by the cooling device are also returned to the communications unit 334. System constraints 328 and, optionally, load constraints 330 may also be sent to the communications unit 334. The nature of this constraint data is described more fully below with reference to FIGS. 6A and 6B.

The controller 326 makes use of the measurement data from the power system components and the constraints data 328 and 330 to calculate operating set points for each of the power subsystem components in order to maximize efficiency for the instantaneous power demands of the system loads. The method of calculating these set points is discussed in more detail below with reference to FIG. 5. The controller sends control commands to the primary converter 302, to the secondary converters 308, and to the cooling system 320. The power subsystem components respond by changing their operating set points in accordance with the commanded adjustments in order to maximize power system efficiency for the current temperature and system loads.

Figure 4:
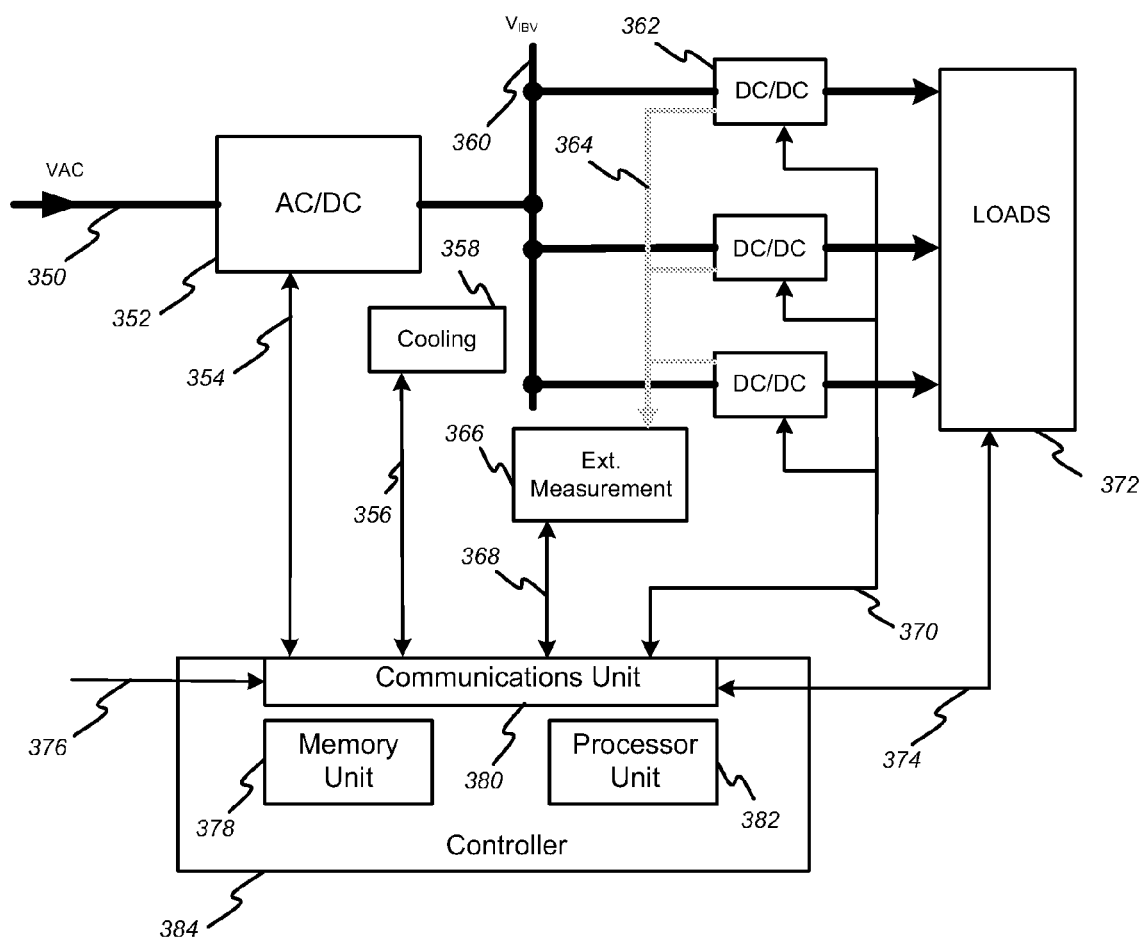
FIG. 4 depicts an alternate embodiment of a dynamically optimized power subsystem in accordance with the present invention in which an external measurement device is used to collect operational data.

FIG. 4 presents an alternative embodiment of a power subsystem in accordance with the present invention. In this embodiment, the secondary DC/DC converters, e.g., 362, are assumed not to have the capability of measuring and reporting voltage and current telemetry themselves. Thus, an external measurement circuit 366, employing sensors well known in the art, is used to gather analog measurements 364 and create digital telemetry that is then sent to the communications unit 380 over a communications bus 368. The external measurement unit 366 may be a centralized unit as shown in FIG. 4, or may comprise several distributed units that are located near the devices to be measured. Devices that are capable of generating their own digital telemetry may communicate directly with the communications unit 380, such as the primary converter 352, and the cooling unit 358 depicted in this embodiment. Any combination of devices that interface with an external measurement unit 366 or that develop their own telemetry would fall within the scope and spirit of the present invention.

Calculating the instantaneous power losses of the primary converter 320 and the secondary converters 308 (see FIG. 3) is difficult because of the compounding nature of measurement errors when a small quantity (the power loss) is determined from the difference of two large quantities (the input power and the output power). To circumvent this problem, a power system operating in accordance with the present invention makes use of characterization data collected for each power subsystem component to enable calculation of the overall system efficiency from measurements of several performance parameters. The controller 326 includes a memory unit 332 that is adapted to store power-loss-model characterization data for each of the components of the power subsystem. A processor unit 336 combines the measured data with the previously gathered characterization data in order to obtain accurate estimates of power loss that are then used to calculate operating efficiency.

Figure 5:
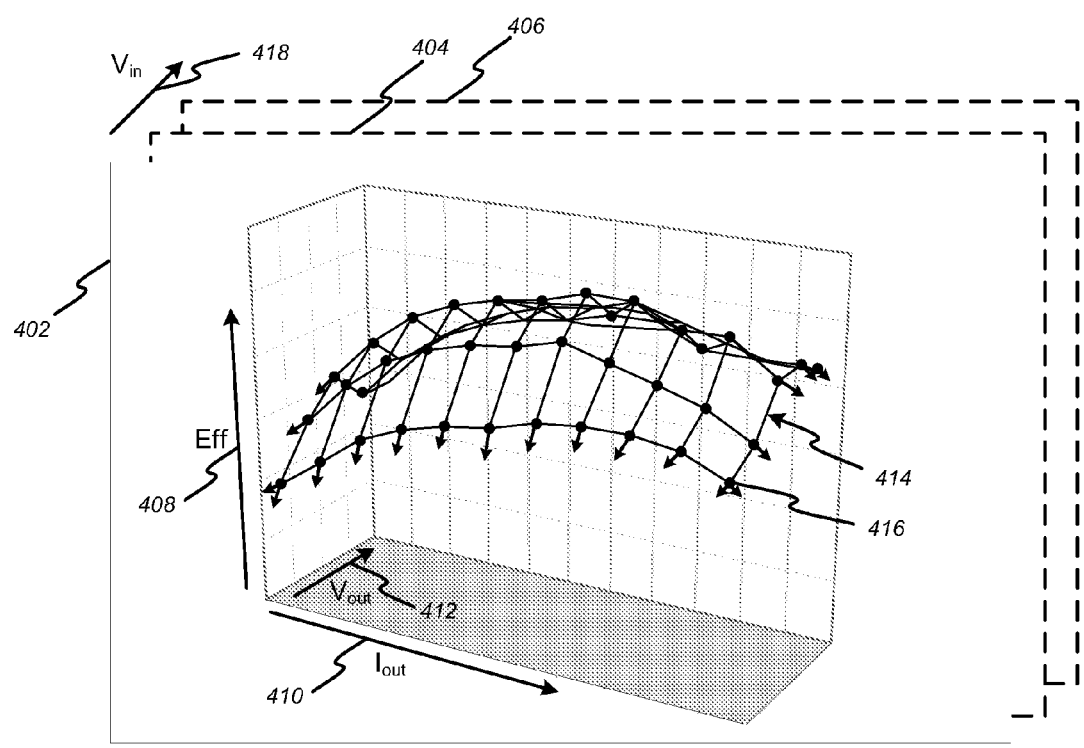
FIG. 5 illustrates a multidimensional analysis, performed in accordance with the present invention, of the efficiency of a typical power converter module.

The efficiency of a power conversion device is a complex function of several parameters, including input and output voltage, input and output current, and temperature, among others. Each component of a power subsystem in accordance with the present invention is characterized to measure its power loss across multiple values of multiple operating parameters. Although this process can be time consuming, it need be performed only once to gather characterization data that can be stored in tabular form in the memory unit 332. FIG. 5 presents a graphical plot 402 of the efficiency 408 of a typical power converter component with respect to two of these dimensions, the output voltage 412 and the output current 410. Here, the efficiency of the device being characterized is plotted along the vertical axis 408, as a function of the output voltage, plotted along an orthogonal axis 412, and the output current, plotted along the other orthogonal axis 410. Each measured point is represented by a filled circle, e.g., 416. These points are connected to form a complex surface 414 representing the efficiency with respect to these two parameters. The preferred method of interpolating between the measured points to generate this complex surface is to use a multi-dimensional natural cubic spline, well known to those skilled in the art. A simpler linear interpolation model could also be used at the cost of some loss of accuracy. Similar techniques can be used to extrapolate beyond the measured data, although the greatest accuracy will be achieved by collecting measured data points that envelope all of the anticipated operating modes of the component when installed in the system. Of course, other methods, well known in the art, of interpolating between and extrapolating beyond measured data would fall within the scope and spirit of the present invention.

The efficiency plot 402 represents efficiency measured with respect to only two of the potential parameters, output voltage and output current, over which efficiency may be characterized. An additional parameter, the input voltage, is represented schematically at 418 with frames 404 and 406 representing additional plots just like that shown at 402 but characterized with respect to different values of the input voltage. Similarly, additional sets of plots could be presented (not shown in FIG. 5) with respect to different values of device temperature or other parameters. The constraints of two-dimensional visualization limit the display of the efficiency surface 414 to two dimensions at a time, but is should be appreciated that the efficiency surface is in reality a multidimensional surface that is a function of several parameters that may be varied during the characterization process. For the purposes of the following discussion, it will be assumed that the efficiency is characterized with respect to the input voltage, $V_{IN}$, the output voltage, $V_{OUT}$, the output current $I_{OUT}$, and the device temperature T, because these are the parameters that will generally produce the largest effect on device efficiency. However, it should be appreciated that fewer or additional characterization parameters may be used to characterize a device in accordance with the present invention. Although the foregoing discussion has focused on the use of the power-loss data to calculate device efficiency, the invention is not limited to applications that use efficiency calculations. The power-loss data can also be used directly to characterize a device in accordance with the present invention.

In a process in accordance with the present invention, the power loss of device d, represented by Pd, is measured for a large number of combinations of $V_{IN}$, $V_{OUT}$, $I_{OUT}$, and T. The number of measurements made and the spacing of the data points in parameter space will be determined by the desired level of accuracy of the predictive power loss multidimensional surface. This surface may be represented as:

$$Pd = F(V_{IN}, V_{OUT}, I_{OUT}, T),$$

where F is a multidimensional function that includes all of the measured characterization data as well as the chosen interpolation or extrapolation algorithms required to produce power loss predictions for combinations of parameters not explicitly measured. This function F is stored in the controller 326 (see FIG. 3) and enables the processor unit 336 of the controller to calculate a predicted power loss for device d for any set of measured parameters returned from the device to the measurement unit, e.g., by path 322. Further, the processor unit 336 is able to calculate a predicted change in the power loss of device d if one of the input parameters were to change by a small amount. For example, if the input voltage were to increase by $\Delta V_{IN}$, the controller would be able to calculate the predicted change in power loss for device d as follows:

$$\Delta Pd = F(V_{IN} + \Delta V_{IN}, V_{OUT}, I_{OUT}, T) - F(V_{IN}, V_{OUT}, I_{OUT}, T).$$

If the processor unit 336 calculates that $\Delta Pd$ is negative, it knows that an increase of $\Delta V_{IN}$ for this device will cause a drop in the power loss, or increase in efficiency, so that this would be a preferred operating state for this device. Similarly, the memory unit 332 of the controller 326 maintains power-loss models for all of the devices in the system and actively retrieves data on the operating state of each device via the communications unit 334, as illustrated schematically in FIG. 3 at 318, 324, and 312. Of course, the controller could also use a communication bus to gather this data rather than the point-to-point connections shown in FIG. 3. The voltages, currents, and temperatures at each of the devices can be measured by standard instrumentation circuits well known to those skilled in the art.

By summing the power losses of the individual components used to construct the power subsystem, the power losses of the full subsystem can be calculated by the processor unit 336 as follows:

$$Pd_{system} = \Sigma_i F_i(V_{INi}, V_{OUTi}, I_{OUTi}, T_i),$$

where the summing index i runs over all of the devices in the subsystem. Taking as an example the system depicted in FIG. 3, which comprises one AC/DC converter and three secondary DC/DC converters, the power loss of the system can be expressed as follows:

$$Pd = F_{AC/DC}(V_{AC}, V_{IBV}, I_{OUT}, T_{AC/DC}) + \Sigma_{sec} F_i(V_{IBV}, V_{OUTi}, I_{OUTi}, T_i),$$

where the first function, $F_{AC/DC}$, describes the power loss of the AC/DC converter, operating at an input voltage $V_{AC}$, an output voltage equal to the intermediate bus voltage $V_{IBV}$, an output current $I_{OUT}$, and a temperature $T_{AC/DC}$. The second expression represents a sum over the three secondary converters, all of which are operating at an input voltage equal to the intermediate bus voltage $V_{IBV}$, and each of which may have different output voltages, output currents, and temperatures. It is then evident that the change in the power loss of the subsystem that would result from a change in the intermediate bus voltage of $\Delta V_{IBV}$ would be given by the following expression:

$$\Delta Pd = F_{AC/DC}(V_{AC}, V_{IBV} + \Delta V_{IBV}, I_{OUT}, T_{AC/DC}) + \sum_{sec} F_i(V_{IBV} + \Delta V_{IBV}, V_{OUTi}, I_{OUTi}, T_i) - F_{AC/DC}(V_{AC}, V_{IBV}, I_{OUT}, T_{AC/DC}) - \sum_{sec} F_i(V_{IBV}, V_{OUTi}, I_{OUTi}, T_i).$$

Again, if this calculated change in power loss is negative, the controller will have determined that an increase in intermediate bus voltage will improve the efficiency of the system for this particular set of operating parameters. The controller 326 will thus command a change in the intermediate bus voltage via the communications unit 334, e.g., over path 318.

However, before commanding such a change in an operating parameter, the controller first must determine whether the change is valid. For example, reducing the intermediate bus voltage below a certain point may take one of the secondary regulators 308 out of its specified operating range or reduce its headroom below recommended levels. Furthermore, dropping the intermediate bus voltage will increase the output current of the primary converter 302 and could place the device into an unsafe operating mode or increase its temperature beyond specified limits. Thus, the memory unit 332 of the controller 326 also contains tables of device constraints against which it must check all potential operating parameter adjustments. Examples of such device constraints are provided in FIGS. 6A and 6B.

Figure 6A:
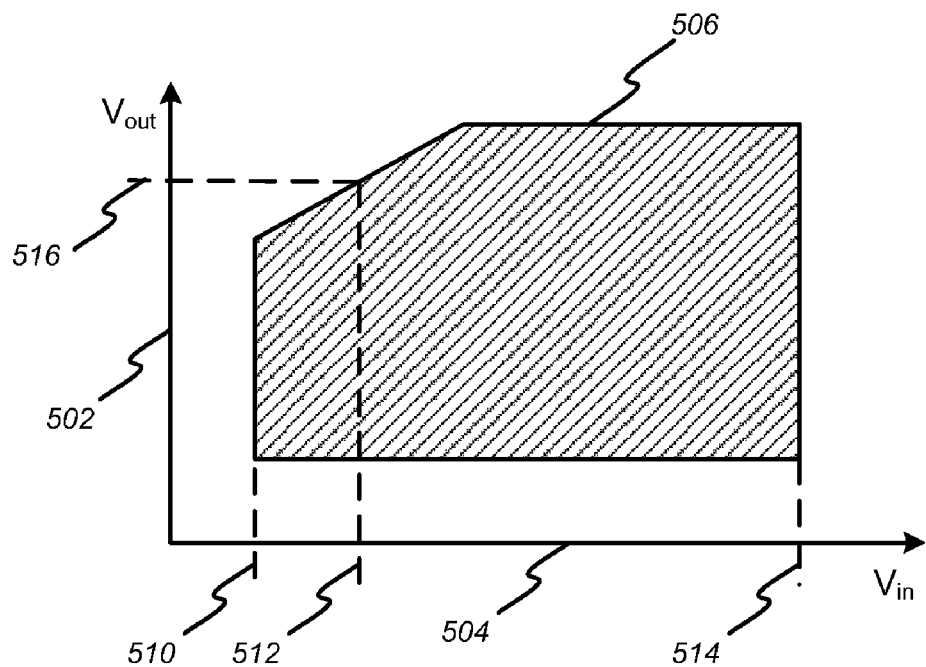
FIGS. 6A and 6B depict device constraints used to limit the effective control range of a system in accordance with the present invention.

FIG. 6A depicts a typical constraint set for a power converter device. Here, a safe operating area 506 is displayed as a function of input voltage 504 and output voltage 502. From the figure it is evident that the value of the input voltage at which the device is operated should not exceed a maximum value depicted at 514. Similarly, it should not be operated at an input voltage less than the value depicted at 510. Further, if a specific output voltage 516 is required, the input voltage cannot be reduced below the voltage level 512, which would be equivalent to overriding the minimum voltage requirement at 510.

Figure 6B:
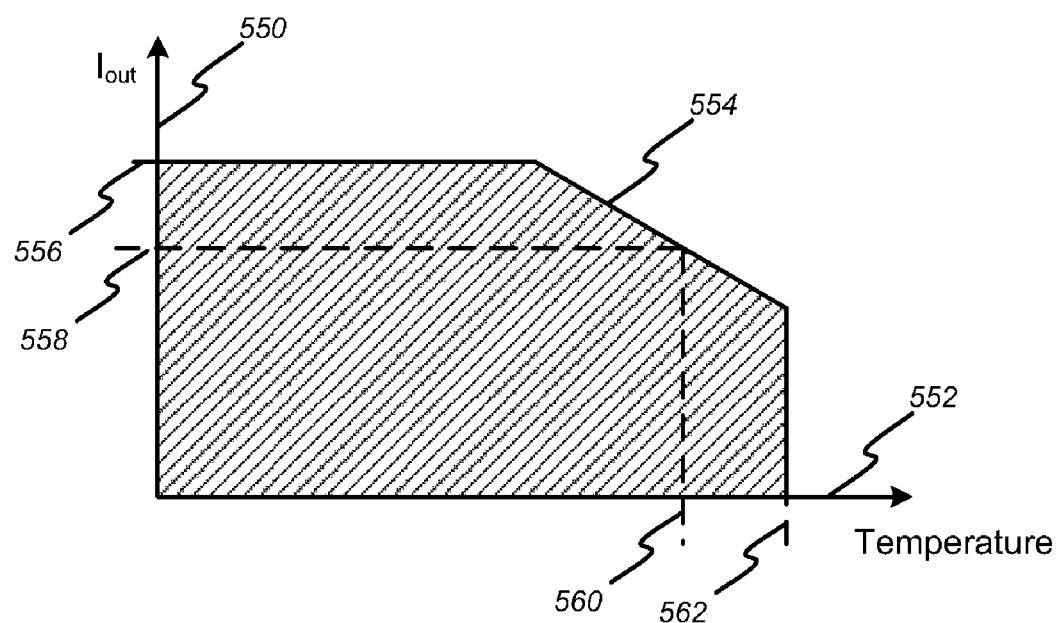

FIG. 6B depicts a similar constraint operating on the output current and temperature of a typical power converter device. Here, the safe operating area 554 defines a region of temperature 552 and output current 550 parameter space beyond which the device should not be operated. The safe region defines a maximum temperature at 562 and a maximum current at 556, but also illustrates that the maximum current may depend on temperature. For example at the temperature indicated at 560, the maximum allowable current is indicated at 558 and is lower than the absolute maximum at 556.

The controller takes into account the constraint files for all of the subsystem components before commanding a change that could potentially cause these limits to be exceeded. At the overall subsystem level, there may be additional constraints that the controller needs to consider. For example, in a given system, it may be very difficult to cool the primary AC/DC converter, so it may be advantageous at the system level to place a larger weight on the AC/DC converter power loss as compared to the other devices. This would result in the system's reaching an optimized operating point with lower AC/DC converter losses to minimize the temperature rise in this device. Such a weighting of the power loss contributions of the constituent devices of a power subsystem can be achieved by the introduction of a weighting coefficient, $K_i$, multiplying the power loss characterization function for device i. The sum of the weighted power loss functions, then, would no longer equal the total system power loss, but would instead represent a more generalized goal function, GF, for the system that the controller would seek to minimize.

$$GF_{system} = \Sigma_i K_i * F_i(V_{INi}, V_{OUTi}, I_{OUTi}, T_i)$$

Additional constraints might come from external equipment. For example, an uninterruptible power supply (UPS) might communicate to the controller that the supply voltage is about to drop, or a power distribution unit (PDU) could communicate status to the controller regarding loads that will be switched on or off or modified, and the controller can make the appropriate adjustments to system parameters to steer the optimally efficient path through these mode changes. In addition, the controller can provide status feedback to the external equipment to, for example, constrain operating modes or set switch ramp rates.

Figure 7:
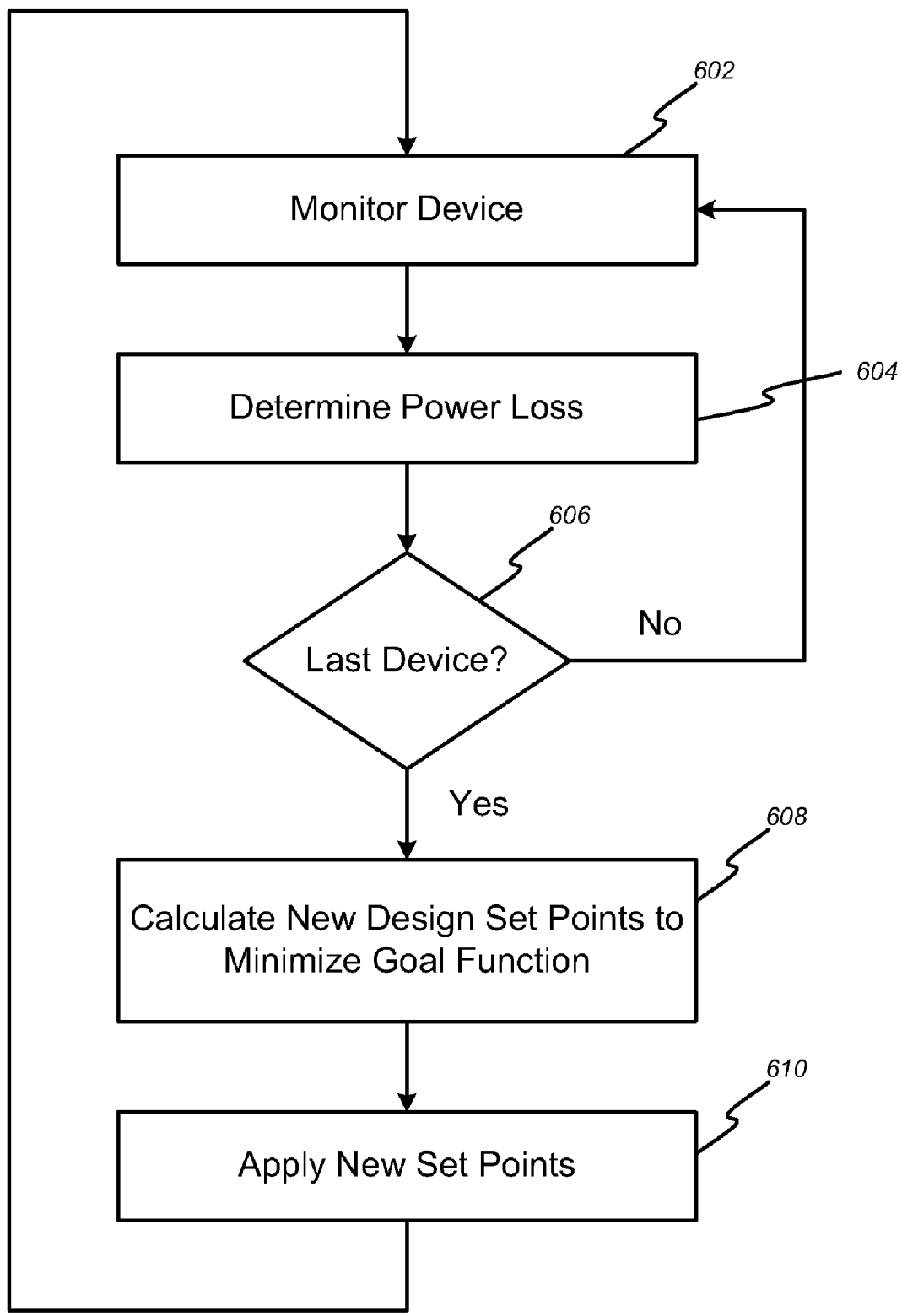
FIG. 7 depicts a flow chart describing the operation of the efficiency optimization procedure in accordance with the present invention.

FIG. 7 depicts a flow chart of a method of performing the optimization process described above in accordance with the present invention. At step 602, the controller collects data from a target device, the data may comprise input and output voltage, output current, device temperature, or any other operating parameters for which characterization data has been obtained previously. At step 604, the controller determines the power loss of the target device using the stored power-loss model and the measured parameters collected at step 602. At step 606, the controller evaluates whether it has obtained data from all of the devices in the system. If not, it returns to step 602 for the next device and continues until it has calculated power losses for all of the devices in the system. At that point, the controller proceeds to step 608, at which the overall goal function for the system is calculated. As discussed previously, the goal function may be equal to the overall system power loss or may be a more generalized sum of weighted power losses. The controller then loads device and system constraint data and calculates new subsystem set points to minimize the goal function subject to the device and system constraints. The minimization process may be performed by any of the methods well known to those skilled in the art, such as a steepest descent method obtained by calculating partial derivatives with respect to each of the control parameters. The controller then proceeds to step 610, at which the new set points are applied to the system, improving the overall efficiency. The controller then returns to step 602 to repeat the entire process such that the overall efficiency of the system is iteratively improved, and so that it responds to changes in load requirements, temperature, etc., on a continuous basis. The rate at which this optimization process runs can be selected based on the system requirements, which would include the temperature stability of the system and the character of the loads, among other considerations.

While the description of the optimization process provided above is largely focused on controlling the intermediate voltage of a typical power subsystem, the process can be applied to any parameter that affects the power losses of a power subsystem. For example, this process may be used to control the speed of a cooling fan to balance the increase in efficiency resulting from lower temperature devices with the increase in power loss that accompanies an increase in fan-drive current. Similarly, this process could be used to control the pulse-width modulation (PWM) switching frequency of the converters to maximize efficiency.

Thus, a power subsystem incorporating a controller in accordance with the present invention that uses power loss models and measured device performance data to actively control design set points results in highly optimized system performance and efficiency. Those skilled in the art will likely recognize further advantages of the present invention, and it should be appreciated that various modifications, adaptations, and alternative embodiments thereof may be made within the scope and spirit of the present invention. The invention is further defined by the following claims.

What is claimed is:

1. A power subsystem comprising:
    a cooling system;
    a primary power converter;
    at least one secondary power converter operatively connected to the primary power converter;
    wherein the power subsystem is configured to measure:
        at least one cooling operating parameter of the cooling system;
        at least one primary operating parameter of the primary power converter; and
        at least one secondary operating parameter of the at least one secondary power converter; and
    a controller connected to the primary power converter, and to the at least one secondary converter, wherein the controller comprises:
        a memory unit configured to store a cooling power-loss model associated with the cooling system, a primary power-loss model associated with the primary power converter, and at least one secondary power-loss model associated with the at least one secondary power converter;
        a communications unit configured to receive the at least one cooling operating parameter, the at least one primary operating parameter and the at least one secondary operating parameter measured by the power subsystem and to send at least one control command to at least one of the cooling system, the primary power converter and the at least one secondary power converter; and
        a processor unit configured to:
            calculate a goal function from the cooling power-loss model, the primary power-loss model, the at least one secondary power-loss model, the at least one cooling operating parameter, the at least one primary operating parameter and the at least one secondary operating parameter;
            calculate a change of state of at least one of the cooling system, the primary power converter and the at least one secondary power converter such that the goal function is minimized; and
            generate the at least one control command based on the change of state;
        wherein the cooling system, the primary power converter and the at least one secondary power converter are configured to change their operating set points based on control commands received from the communications unit.

2. The power subsystem of claim 1, wherein:
    the at least one primary operating parameter of the primary power converter comprises at least one of a primary input voltage, a primary output voltage, a primary output current, and a primary temperature of the primary power converter; and
    the at least one secondary operating parameter of the at least one secondary power converter comprises at least one of a secondary input voltage, a secondary output voltage, a secondary output current, and a secondary temperature of the at least one secondary power converter.

3. The power subsystem of claim 1, wherein the goal function comprises a weighted sum of power losses associated with corresponding ones of the primary power converter and the at least one secondary power converter.

4. The power subsystem of claim 3, wherein the goal function is equal to a total power loss of the power subsystem.

5. The power subsystem of claim 1, wherein the cooling system further comprises an active cooling system operatively coupled to the controller.

6. The power subsystem of claim 1, wherein the primary power converter comprises at least one of an AC/DC converter and a DC/DC converter.

7. The power subsystem of claim 1, wherein the at least one secondary power converter comprises at least one of a switching converter, a buck converter, a boost converter, and a linear regulator.

8. The power subsystem of claim 1, wherein the controller comprises at least one of an application-specific integrated circuit (ASIC), a field-programmable gate array (FPGA), a digital signal processing (DSP) device, a microcontroller, and a general-purpose processing device.

9. The power subsystem of claim 1, wherein the controller comprises an external processing device connected to the power subsystem.

10. The power subsystem of claim 1, wherein the controller comprises logic circuits residing within at least one of the primary power converter and the at least one secondary power converter.

11. The power subsystem of claim 1, wherein at least one of the primary power converter and the at least one secondary power converter is adapted to measure at least one of the at least one primary operating parameter and the at least one secondary operating parameter.

12. The power subsystem of claim 1, further comprising a measurement unit adapted to measure the at least one primary operating parameter and the at least one secondary operating parameter.

13. The power subsystem of claim 1, wherein the controller is further adapted to store subsystem constraints data comprising at least one of:
    a maximum input voltage, a minimum input voltage, a maximum output voltage, a minimum output voltage, a maximum temperature, a maximum current, and a minimum current of the primary power converter; and at least one of:
    a maximum input voltage, a minimum input voltage, a maximum output voltage, a minimum output voltage, a maximum temperature, a maximum current, and a minimum current of the at least one secondary power converter;
    wherein the processor unit is further adapted to calculate a change of state of at least one of the primary power converter and the at least one secondary power converter such that the goal function is minimized and such that none of the subsystem constraints is violated.

14. The power subsystem of claim 1, wherein the at least one secondary power converter is connected to at least one load; and
wherein the controller is further adapted to store load constraints data associated with the at least one load comprising at least one of:
a maximum voltage, a minimum voltage, a maximum current, a minimum current, and a maximum temperature for the at least one load;
wherein the processor unit is further adapted to calculate a change of state of at least one of the primary power converter and the at least one secondary power converter such that the goal function is minimized and such that none of the load constraints is violated.

15. A power subsystem comprising:
a cooling system, comprising at least one of a fan and a heat pump;
a primary power converter, comprising at least one of a DC/DC converter and an AC/DC converter;
at least one secondary power converter, comprising at least one of a switching converter, a buck converter, a boost converter, and a linear regulator, operatively connected to the primary power converter;
wherein the power subsystem is configured to measure:
cooling parameters comprising at least one of a cooling voltage, a cooling voltage, and a cooling temperature of the cooling system;
primary parameters comprising at least one of a primary input voltage, a primary output voltage, a primary output current, and a primary temperature of the primary power converter; and
secondary parameters comprising at least one of a secondary input voltage, a secondary output voltage, a secondary output current, and a secondary temperature of the at least one secondary power converter; and
a controller connected to the cooling system, the primary power converter, and to the at least one secondary converter, wherein the controller comprises:
a memory unit configured to store a cooling power-loss model associated with the cooling system, a primary power-loss model associated with the primary power converter, and at least one secondary power-loss model associated with the at least one secondary power converter;
a communications unit configured to receive measurements of the cooling parameters, the primary parameters and the secondary parameters and to send at least one control command to at least one of the cooling system, the primary power converter and the at least one secondary power converter; and
a processor unit configured to:
calculate a goal function from the cooling power-loss model, the primary power-loss model, the at least one secondary power-loss model, the cooling parameters, the primary parameters, and the secondary parameters, wherein the goal function comprises a weighted sum of power losses associated with corresponding ones of the cooling system, the primary power converter and the at least one secondary power converter; and
calculate a change of state of at least one of the cooling system, the primary power converter and the at least one secondary power converter such that the goal function is minimized; and
generate the at least one control command based on the change of state;
wherein the cooling system, the primary power converter and the at least one secondary power converter are configured to change their operating set points based on control commands received from the communications unit.

16. The power subsystem of claim 15, wherein the goal function is equal to a total power loss of the power subsystem.

17. The power subsystem of claim 15, wherein the cooling system further comprises an active cooling system.

18. The power subsystem of claim 15, wherein the controller comprises at least one of an application-specific integrated circuit (ASIC), a field-programmable gate array (FPGA), a digital signal processing (DSP) device, a microcontroller, and a general-purpose processing device.

19. The power subsystem of claim 15, wherein the controller comprises an external processing device connected to the power subsystem.

20. The power subsystem of claim 15, wherein the controller comprises logic circuits residing within at least one of the primary power converter and the at least one secondary power converter.

21. The power subsystem of claim 15, wherein the controller is further adapted to store subsystem constraints data comprising at least one of:
a maximum input voltage, a minimum input voltage, a maximum output voltage, a minimum output voltage, a maximum temperature, a maximum current, and a minimum current of the primary power converter; and at least one of:
a maximum input voltage, a minimum input voltage, a maximum output voltage, a minimum output voltage, a maximum temperature, a maximum current, and a minimum current of the at least one secondary power converter;
wherein the processor unit is further adapted to calculate a change of state of at least one of the primary power converter and the at least one secondary power converter such that the goal function is minimized and such that none of the subsystem constraints is violated.

22. The power subsystem of claim 15, wherein the at least one secondary power converter is connected to at least one load; and
wherein the controller is further adapted to store load constraints data associated with the at least one load comprising at least one of:
a maximum voltage, a minimum voltage, a maximum current, a minimum current, and a maximum temperature for the at least one load;
wherein the processor unit is further adapted to calculate a change of state of at least one of the primary power converter and the at least one secondary power converter such that the goal function is minimized and such that none of the load constraints is violated.

23. A method for dynamically optimizing efficiency of a power subsystem containing a cooling system and a plurality of power devices comprises:
creating power-loss models of the cooling system and each of the plurality of power devices;
measuring operating parameters of the cooling system and each of the plurality of power devices;
calculating the power loss of the cooling system and each of the plurality of power devices from the measured operating parameters and the power-loss models for the cooling system and each of the plurality of power devices;

calculating a goal function by forming a weighted sum of the power losses calculated for the cooling system and each of the plurality of power devices;

calculating a change of state of the operating parameters of the cooling system and ones of the plurality of power devices such that the goal function is minimized;

providing at least one control command to at least one of the cooling system and the plurality of power devices; and repeating the measuring, calculating, and providing commanding steps on a periodic basis;

wherein the at least one control command is based on the change of state, and the cooling system and the plurality of power devices are configured to change their operating set points based on received control commands.

24. The method of claim 23, wherein the step of measuring operating parameters of each of the plurality of power devices further comprises measuring at least one of an input voltage, an output voltage, an output current, and a temperature of each of the plurality of power devices.

25. The method of claim 23, wherein the step of creating power-loss models of each of the plurality of power devices further comprises:

measuring the power loss of each of the plurality of power devices for a plurality of values of at least one of an input voltage, an output voltage, an output current, and a temperature of respective ones of the plurality of power devices;

storing the measured power loss-values;

creating a function to predict power loss of each of the plurality of power devices by interpolating between and extrapolating beyond the measured power-loss values.

26. The method of claim 23, wherein the step of calculating a goal function further comprises creating a sum of the calculated power losses of each of the plurality of power devices that is equal to a total power loss of the power subsystem.

27. The method of claim 23, further comprising:

creating a power device constraints database including at least one of a maximum input voltage, a minimum input voltage, a maximum output voltage, a minimum output voltage, a maximum temperature, a maximum current, and a minimum current for each of the plurality of power devices; and wherein the step of calculating a change of state of the operating parameters further comprises limiting possible changes of state such that none of the constraints in the power device constraints database is violated.

28. The method of claim 23, further comprising:

connecting the power subsystem to at least one load;

creating a load constraints database including at least one of a maximum input voltage, a minimum input voltage, a maximum temperature, a maximum current, and a minimum current for the at least one load; and wherein the step of calculating a change of state of the operating parameters further comprises limiting possible changes of state such that none of the constraints in the load constraints database is violated.

* * * * *